(12) United States Patent
Kosaka et al.

(10) Patent No.: US 11,415,087 B2
(45) Date of Patent: Aug. 16, 2022

(54) EGR DEVICE

(71) Applicant: KUBOTA Corporation, Osaka (JP)

(72) Inventors: Tetsuya Kosaka, Sakai (JP);
Kazumichi Matsuishi, Sakai (JP);
Toshio Nakanishi, Sakai (JP); Naoya Junicho, Sakai (JP); Kensuke Fujita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/897,822

(22) Filed: Jun. 10, 2020

(65) Prior Publication Data
US 2020/0408172 A1    Dec. 31, 2020

(30) Foreign Application Priority Data

Jun. 28, 2019 (JP) .............................. JP2019-122397

(51) Int. Cl.
| | |
|---|---|
| *F02M 26/05* | (2016.01) |
| *F02M 26/06* | (2016.01) |
| *F02M 26/07* | (2016.01) |
| *F02D 41/00* | (2006.01) |
| *F02M 26/23* | (2016.01) |

(52) U.S. Cl.
CPC ............ *F02M 26/05* (2016.02); *F02M 26/06* (2016.02); *F02M 26/07* (2016.02); *F02D 41/0007* (2013.01); *F02D 2200/0406* (2013.01); *F02M 26/23* (2016.02); *F05D 2220/40* (2013.01)

(58) Field of Classification Search
CPC ........ F02M 26/05; F02M 26/06; F02M 26/07; F02M 26/23; F02D 2200/0406; F02D 41/0007; F02D 41/0065; F05D 2220/40; Y02T 10/12; Y02T 10/40
See application file for complete search history.

(56) References Cited

U.S. PATENT DOCUMENTS

2019/0331129 A1*  10/2019  Zimmerman ......... F04D 25/024
2020/0191165 A1*  6/2020  Rolandson .......... F04D 29/4213

FOREIGN PATENT DOCUMENTS

JP          2017-077833 A      4/2017

* cited by examiner

*Primary Examiner* — Audrey B. Walter
*Assistant Examiner* — Edward Bushard
(74) *Attorney, Agent, or Firm* — Panitch Schwarze Belisario & Nadel LLP

(57) ABSTRACT

In an EGR device in which an EGR passage is merged with an intake passage communicating with a compressor housing of a supercharger, the EGR passage is extended to the inner side of the intake passage with respect to a junction between the EGR passage and the intake passage, and the position of a terminal end of an extended passage section in an air flow direction matches the position of a terminal end of the intake passage, the extended passage section being the EGR passage extended. The merged passage section where the EGR passage is merged with the intake passage is a joint pipe that connects an intake tube and the compressor housing.

18 Claims, 6 Drawing Sheets

EGR DEVICE

CROSS-REFERENCE TO RELATED APPLICATION

This application claims priority under 35 U.S.C. § 119(b) to Japanese Patent Application No. 2019-122397, filed Jun. 28, 2019, the disclosure of which is incorporated herein by reference.

BACKGROUND OF THE INVENTION

Field of the Invention

The present invention relates to an EGR device of an engine.

Description of Related Art

In conventional EGR devices, in addition to a high-pressure EGR (HP-EGR) system, an increasing number of engines adopt a low-pressure EGR (LP-EGR) system as a countermeasure to reduce low-speed exhaust gas (Nox). In an EGR device adopting a low-pressure EGR system, EGR gas is returned to the front of an intake compressor.

BRIEF SUMMARY OF THE INVENTION

In a conventional low-pressure EGR device, if a supercharger sucks ice blocks, an impeller of an intake compressor may be damaged. Therefore, it is necessary to stop the EGR device at a low temperature of 0° C. or lower, and there is a problem in terms of usability.

An object of the present invention is to provide an EGR device improved so as to solve such a problem that moisture contained in EGR gas condenses and forms ice blocks in an intake passage, by contriving the structure.

The present invention relates to an EGR device in which an EGR passage is merged with an intake passage communicating with a compressor housing of a supercharger, in which the EGR passage is extended to the inner side of the intake passage with respect to a junction between the EGR passage and the intake passage, and the position of a terminal end of an extended passage section in an air flow direction matches the position of a terminal end of the intake passage, the extended passage section being the EGR passage extended.

According to the present invention, the point where the EGR gas enters the intake passage is set immediately before the compressor housing of the supercharger. Therefore, it is possible to supply EGR gas to the supercharger before moisture contained in the EGR gas is cooled by cold intake air and is frozen. Therefore, the effect of preventing the problem that the moisture in the EGR gas is cooled by cold air (fresh air) to form ice blocks and the ice blocks are sucked to damage the impeller of the intake compressor is obtained.

DETAILED DESCRIPTION OF THE INVENTION

Hereinafter, an embodiment of an EGR device according to the present invention will be described with reference to the drawings, in a case where the embodiment is applied to an industrial diesel engine used for an agricultural machine or a construction machine.

Figure 1:
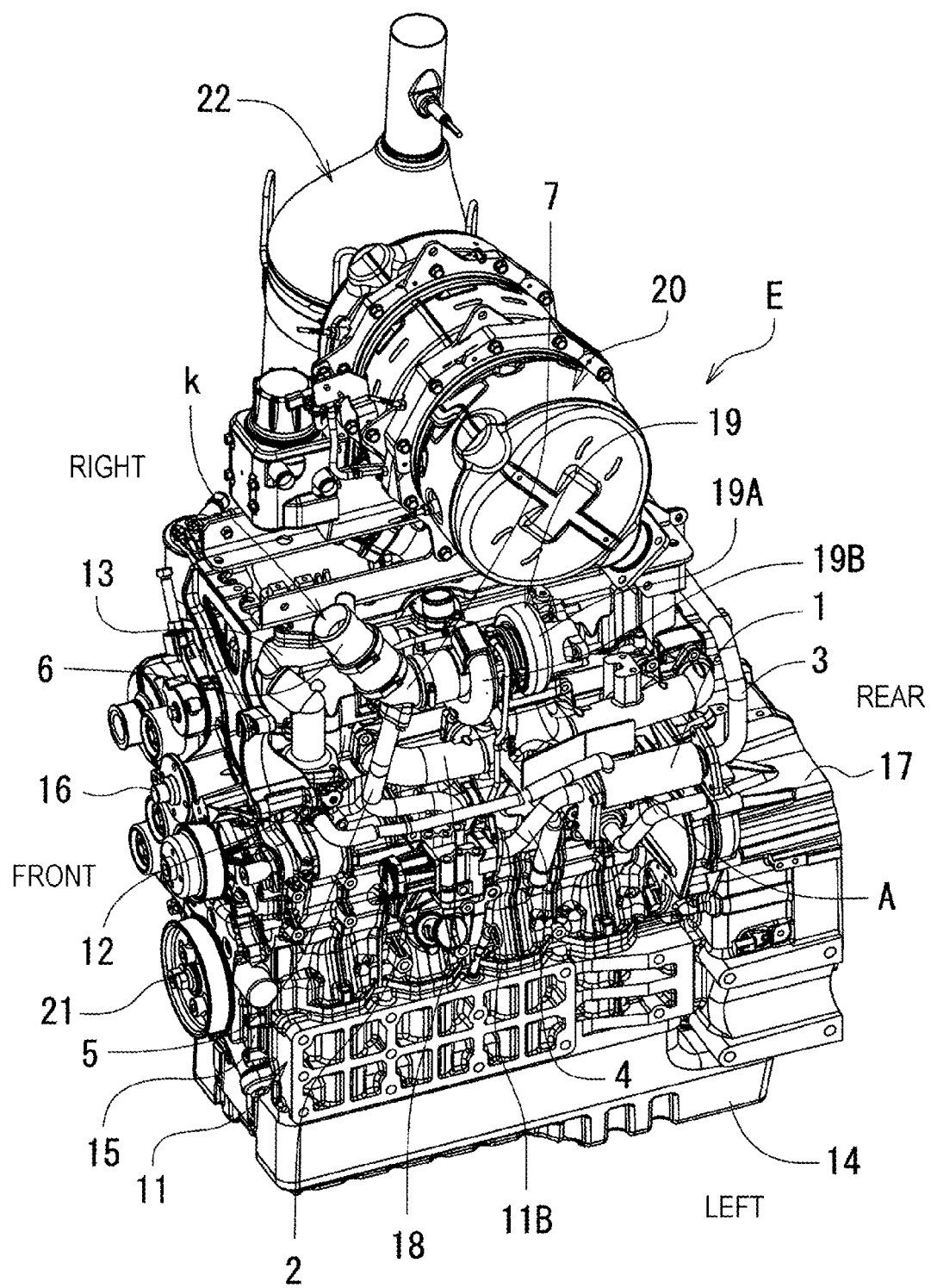
FIG. 1 is a left side view illustrating a diesel engine with an EGR device.
Figure 2:
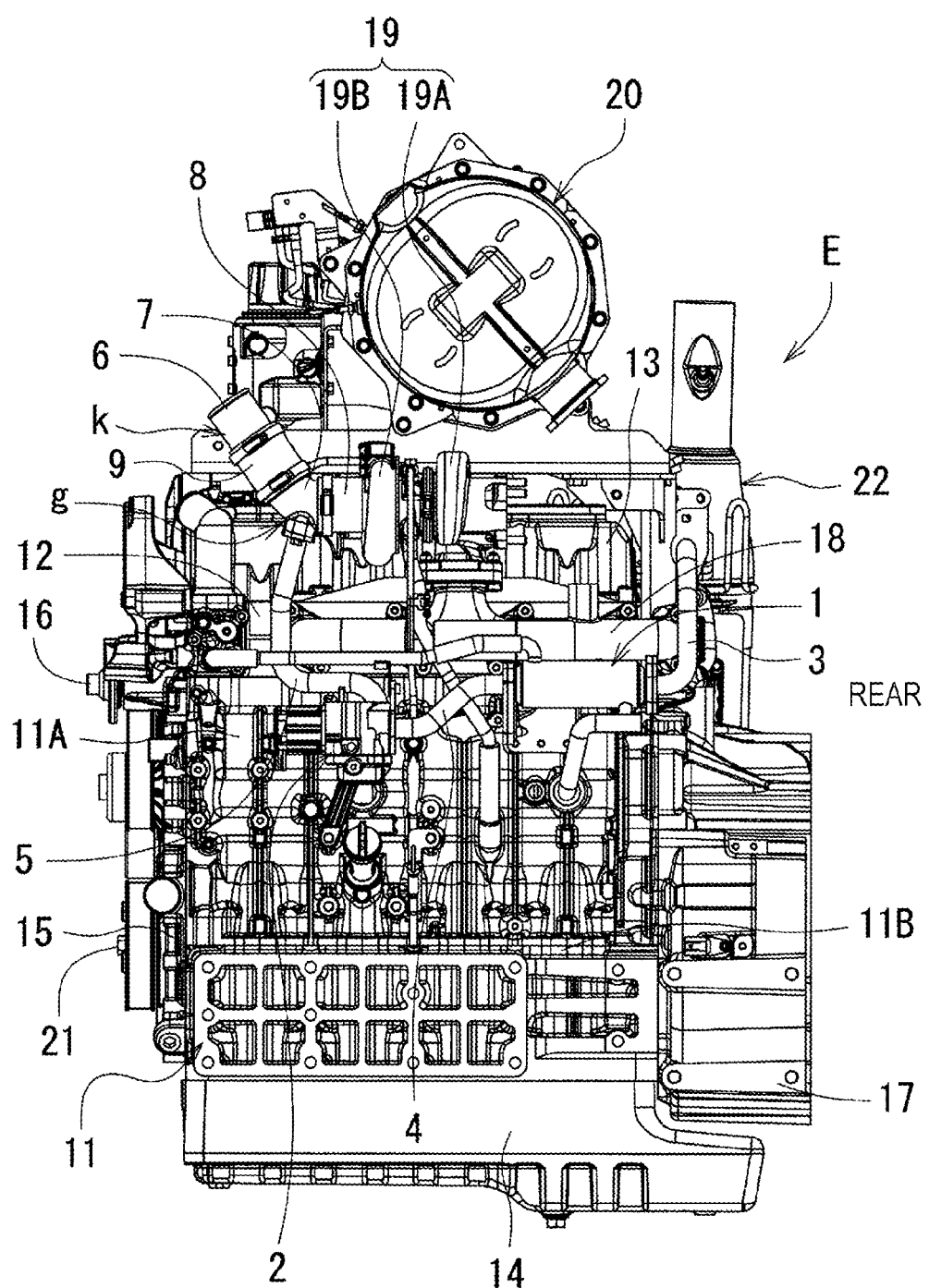
FIG. 2 is a perspective view of the diesel engine illustrated in FIG. 1 as viewed from the upper front left.

As illustrated in FIGS. 1 and 2, in a diesel engine E, a cylinder head 12 is mounted on an upper portion of a cylinder block 11, a head cover 13 is mounted on an upper portion of the cylinder head 12, and an oil pan 14 is mounted on a lower portion of the cylinder block 11. A transmission case 15 is mounted on a front end portion of the cylinder block 11, a drive shaft 16 of an engine cooling fan (not illustrated) is disposed at a front portion of the transmission case 15, and a flywheel housing 17 is disposed at a rear portion of the cylinder block 11. The upper half of the cylinder block 11 is formed as a cylinder 11A, and the lower half of the cylinder block 11 is formed as a crankcase 11B.

On the left side of the engine E, an exhaust manifold 18, a supercharger 19, an EGR cooler 1, an EGR valve 2, and the like are disposed. An exhaust gas treatment device 20 and the like are disposed on the upper side of the engine E, a crankshaft 21 is disposed on the front side of the engine E, and a second exhaust gas treatment device 22 and the like are disposed on the right side of the engine E.

The supercharger (turbocharger) 19 includes a turbine housing 19A that houses an exhaust turbine (not illustrated) and a compressor housing 19B that houses an intake compressor (not illustrated), and is disposed above the exhaust manifold 18.

Figure 3:
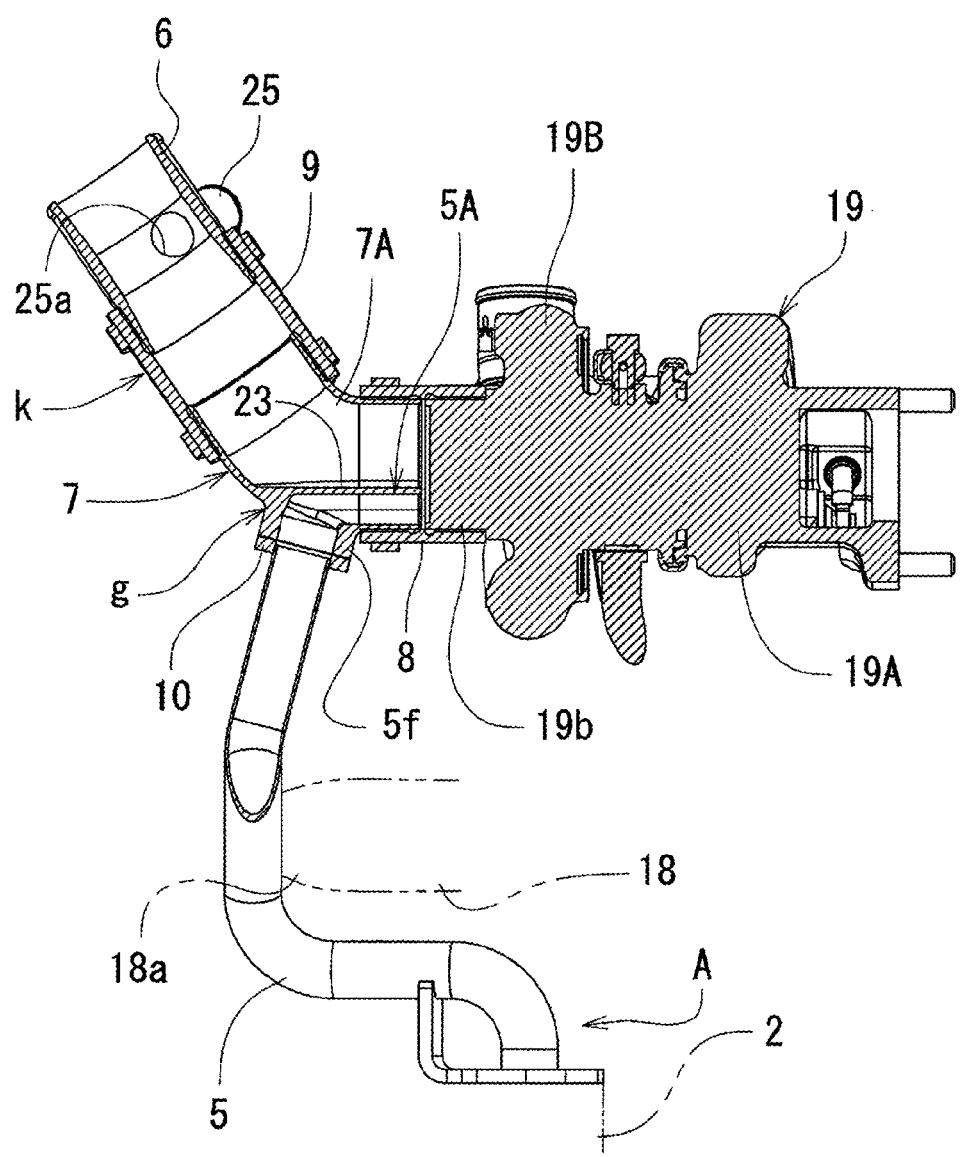
FIG. 3 is a cross-sectional view of a main part illustrating a structure of recirculation to an EGR gas intake passage.

As illustrated in FIG. 3, the EGR device A includes an EGR cooler 1, an EGR valve 2, a first EGR passage 3, a second EGR passage 4, a third EGR passage 5, and the like. The first EGR passage 3 is a passage that connects the exhaust gas treatment device 20 or the second exhaust gas treatment device 22 to the EGR cooler 1, and the second EGR passage 4 is a passage that connects the EGR cooler 1 to the EGR valve 2. The third EGR passage 5 is a passage that connects the EGR valve 2 to an intake passage k.

As illustrated in FIGS. 2 and 3, the intake passage k includes an intake pipe (an example of an intake tube) 6 connected to an air supply source (such as an air cleaner: not illustrated), a joint pipe (an example of a merged passage section) 7 connected to an intake inlet cylindrical section 19b of the compressor housing 19B via a connecting hose 8, and a coupling hose 9 connecting the intake pipe 6 to the joint pipe 7. Note that the intake passage k refers to the entire passage from an air supply source to an intake manifold (not illustrated), and is not limited to the intake pipe 6, the joint pipe 7, the connecting hose 8, and the coupling hose 9 described above.

The third EGR passage 5 including pipe material is contrived so as to rise through the outer peripheral side of the curved surface portion of a foremost branch pipe 18a (branch pipe 18a of the first cylinder) of the exhaust manifold 18 so that the third EGR passage 5 does not protrude to the left and to the front as much as possible. As a result, the third EGR passage 5 can be merged with the joint pipe 7 in a rising posture facing slightly rearward. A blow-by tube 25 for recirculating blow-by gas to the intake passage k may be connected to the intake pipe 6 and an opening 25a may be provided in the intake pipe 6 (see FIG. 3).

The intake passage k into which the third EGR passage 5 is merged is, specifically, a joint pipe 7 made of metal (such as cast iron). As illustrated in FIGS. 3 to 6, the joint pipe 7 includes a pipe body 7A bent at about 60 degrees, an extended passage section 5A integrally formed inside the pipe body 7A, a terminal end 7s having a front-end opening 7c of the pipe body 7A, and a starting end 7d having a base-end opening 7b of the pipe body 7A.

The extended passage section 5A has a flange section 5f having a base-end opening 5b and a terminal end 5s having a front-end opening 5c. A nut section 24 for bolting an opening flange 10 of the third EGR passage 5 is formed in the flange section 5f.

The third EGR passage 5 is extended to the inner side of the joint pipe 7 with respect to a junction g between the third EGR passage 5 and the joint pipe 7, and the position of the terminal end 5s of the extended passage section 5A in an air flow direction matches the position of the terminal end 7s of the joint pipe 7, the extended passage section 5A being the EGR passage extended. The extended passage section 5A is configured to share an inner wall 7a of the joint pipe 7, and a shared portion 5a of the inner wall 7a in the extended passage section 5A is set at one location in the circumferential direction of the extended passage section 5A. The joint pipe 7 is formed as a single component in which the pipe body 7A, which is the intake passage k, and the extended passage section 5A are integrated. Note that the terminal end 7s of the joint pipe 7 is a terminal end of the intake passage k connected to the compressor housing 19B.

As illustrated in FIGS. 3 to 6, the extended passage section 5A has a space section surrounded by a flange section 5f, a partition wall 23 formed across the inner wall 7a of the pipe body 7A, and the inner wall 7a partitioned by the partition wall 23, that is, the shared portion 5a. The extended passage section 5A includes a base-end opening 5b communicating with the opening flange 10 of the third EGR passage 5 and a front-end opening 5c communicating with the intake inlet cylindrical section 19b of the compressor housing 19B. However, the extended passage section 5A is not communicated with a joint passage 7w, which is internal space of the joint pipe 7. In the present embodiment, the junction g is a location where constituent members of the joint pipe 7 and the third EGR passage 5 are integrated.

Figure 4:
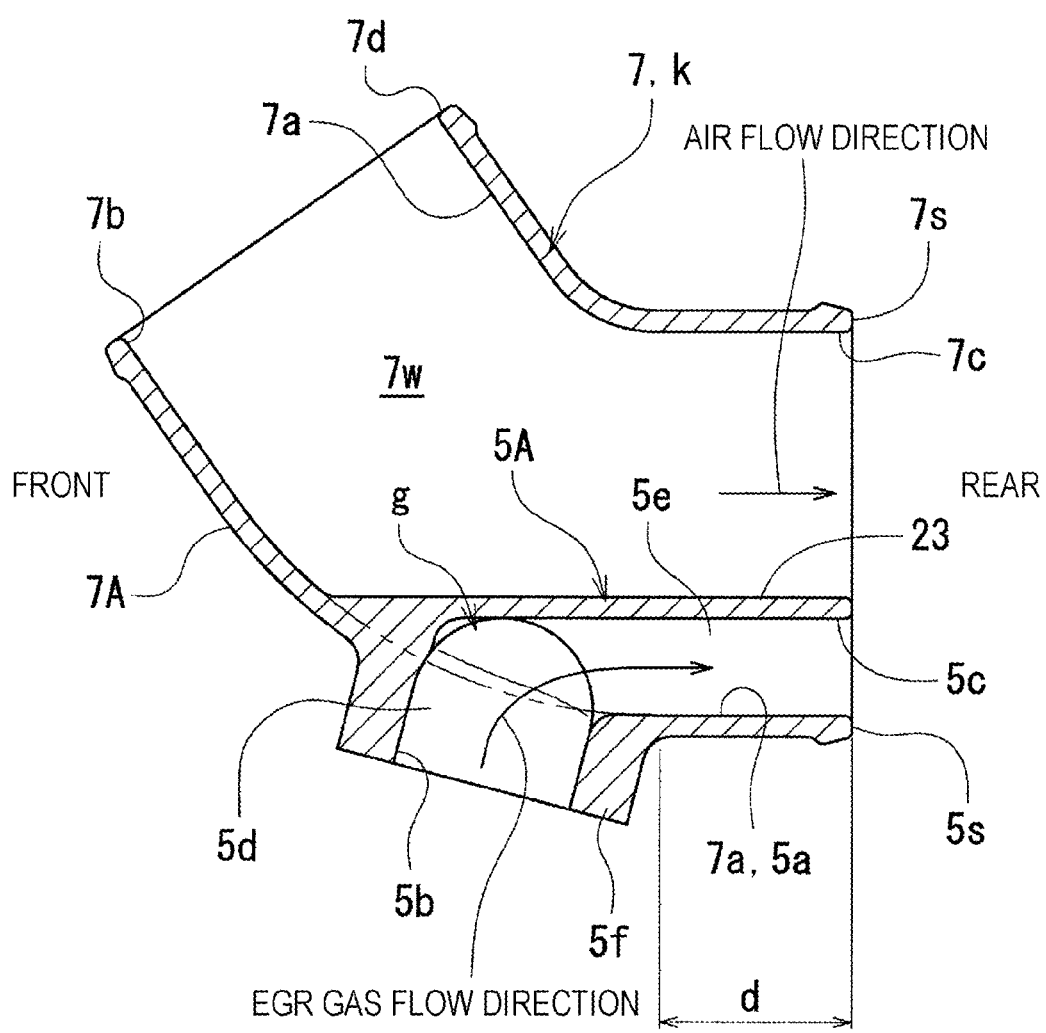
FIG. 4 is a cross-sectional view of a joint hose as viewed from the left.
Figure 5:
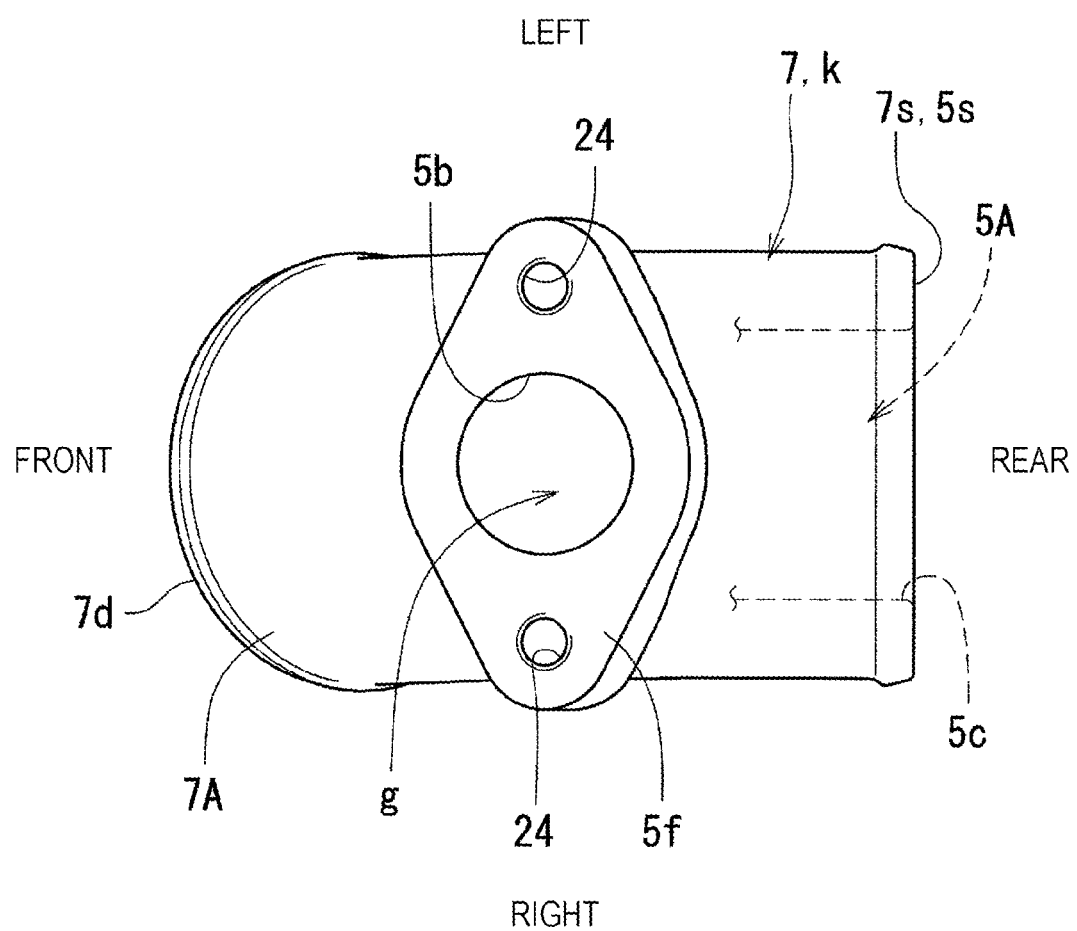
FIG. 5 is a rear view of the joint hose.
Figure 6:
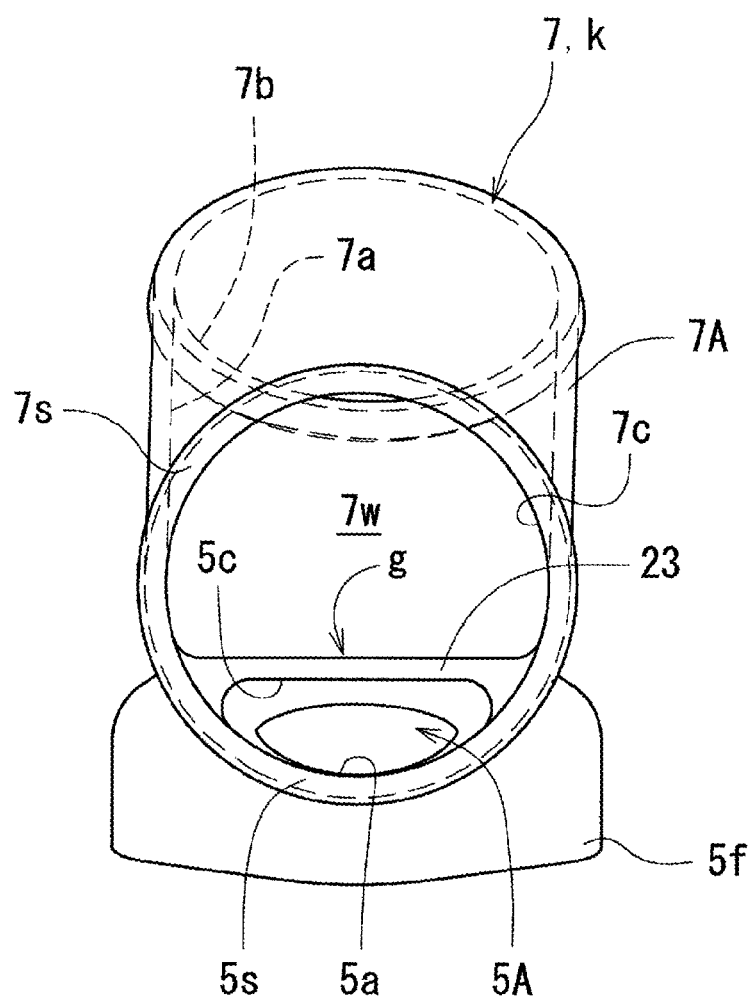
FIG. 6 is a bottom view of the joint hose.

As illustrated in FIG. 4, the flange section 5f forming the junction g is formed on the outer wall on the radial outside of the bent portion of the joint pipe 7 in a state facing the tangential direction of the bent portion of the joint pipe 7. The flange section 5f has a passage front section 5d having the base-end opening 5b and extending in a direction perpendicular to the tangential direction. A passage rear section 5e continuous with the passage front section 5d is formed by the partition wall 23 and the inner wall 7a (shared portion 5a), extends in the horizontal direction, and has the front-end opening 5c. The extended passage section 5A includes the passage front section 5d and the passage rear section 5e.

As illustrated in FIG. 4, a length d of a horizontal pipe section (reference sign of which is omitted) on the front end side with respect to the flange section 5f in the joint pipe 7 is set to a length necessary for fitting with the connecting hose 8. The sum of the length d and the thickness of the flange section 5f substantially corresponds to the length of the passage rear section 5e. The EGR gas (exhaust gas) directly enters the intake inlet cylindrical section 19b from the extended passage section 5A without passing through the joint passage 7w, and is immediately sucked into the intake compressor (not illustrated).

A junction g which is the point where the EGR gas enters the intake passage k is set immediately before the compressor housing 19B of the supercharger 19. Therefore, it is possible to supply EGR gas to the supercharger 19 before moisture contained in the EGR gas is cooled by cold intake air and is frozen. As a result, the effect of preventing the problem that the moisture in the EGR gas is cooled by cold air (fresh air) to form ice blocks and the ice blocks are sucked to damage the impeller of the intake compressor is obtained.

The terminal end 5s of the extended passage section 5A and the terminal end 7s of the pipe body 7A are located at the same position in the air flow direction. Therefore, in comparison with a case where the terminal end 5s of the extended passage section 5A is located forward of the terminal end 7s of the pipe body 7A in the air flow direction, EGR gas is hard to be cooled because EGR gas is hardly directly exposed to cold intake air. Therefore, there is an advantage that it is possible to more reliably prevent moisture from being frozen.

The extended passage section 5A is formed so as to be biased toward the outer peripheral side in the radial direction of the joint pipe 7 so that the inner wall 7a is shared only at one location (shared portion 5a) inside the joint pipe 7. Therefore, only the partition wall 23 is in contact with the joint passage 7w, and the location (area) exposed to cold air can be reduced as much as possible.

The extended passage section 5A is formed so as to protrude inside the joint pipe 7 and does not protrude outside the joint pipe 7, which is preferable because the structure of fitting the connecting hose 8 on the intake inlet cylindrical section 19b of the compressor housing 19B and the front-end section of the joint pipe 7 can be easily adopted.

In addition, the extended passage section 5A has a structure of including the passage rear section 5e in which at least the length (d of FIG. 4) of the portion fitted on the connecting hose 8 is parallel to the joint passage 7w and starting from the bent portion of the joint pipe 7. Therefore, there is also an advantage that the EGR gas efficiently flows into the intake passage k (compressor housing 19B) by the ejector effect due to an air flow.

ANOTHER EMBODIMENT

Although illustration is omitted, in a case of manufacturing a joint pipe 7 from an aluminum casting (aluminum alloy casting), in order to avoid corrosion caused by EGR gas (exhaust gas), a stainless steel tube is inserted or press-fitted into an extended passage section 5A. Alternatively, a structure in which a stainless steel tube is directly inserted into a pipe body 7A may be adopted.

What is claimed is:

1. An EGR device in which an EGR passage is merged with an intake passage communicating with a compressor housing of a supercharger,
   wherein
   a merged passage section where the EGR passage is merged with the intake passage is formed in a joint pipe that is cylindrical in cross section and connects an intake tube and the compressor housing, and
   the EGR passage merges with the intake passage at a junction in the joint pipe,
   the EGR passage is extended to an inner side of the joint pipe, a position of a terminal end of an extended passage section in an air flow direction matches a position of a terminal end of the joint pipe, the extended passage section being the EGR passage extended, and the extended passage section is formed so as to protrude inside the joint pipe and does not protrude outside the joint pipe, and a downstream cross-sectional area of the intake passage located downstream from the junction and within the joint pipe is smaller than an upstream cross-sectional area of an upstream portion of the intake passage located upstream from the junction and within the joint pipe, and a connecting hose that is cylindrical in cross section is fitted on an intake inlet cylindrical section of the compressor housing and a front-end section of the joint pipe.

2. The EGR device according to claim 1, wherein the joint pipe is formed as a single component in which the intake passage and the extended passage section are integrated.

3. The EGR device according to claim 1, wherein the joint pipe includes metal material.

4. The EGR device according to claim 2, wherein the joint pipe includes metal material.

5. The EGR device according to claim 1, wherein the extended passage section is configured to share an inner wall of the intake passage.

6. The EGR device according to claim 5, wherein a shared portion of the inner wall in the extended passage section is set at one location in a circumferential direction of the extended passage section.

7. The EGR device according to claim 1, wherein a planar partition wall separates the EGR passage from the intake passage within the joint pipe.

8. The EGR device according to claim 7, wherein the joint pipe includes metal material.

9. The EGR device according to claim 7, wherein the joint pipe is formed as a single component in which the intake passage and the extended passage section are integrated.

10. The EGR device according to claim 9, wherein the joint pipe includes metal material.

11. The EGR device according to claim 7, wherein the extended passage section is configured to share an inner wall of the intake passage.

12. The EGR device according to claim 11, wherein the joint pipe includes metal material.

13. The EGR device according to claim 11, wherein the joint pipe is formed as a single component in which the intake passage and the extended passage section are integrated.

14. The EGR device according to claim 13, wherein the joint pipe includes metal material.

15. The EGR device according to claim 11, wherein a shared portion of the inner wall in the extended passage section is set at one location in a circumferential direction of the extended passage section.

16. The EGR device according to claim 15, wherein the joint pipe includes metal material.

17. The EGR device according to claim 15, wherein the joint pipe is formed as a single component in which the intake passage and the extended passage section are integrated.

18. The EGR device according to claim 17, wherein the joint pipe includes metal material.

* * * * *